Figure 1:
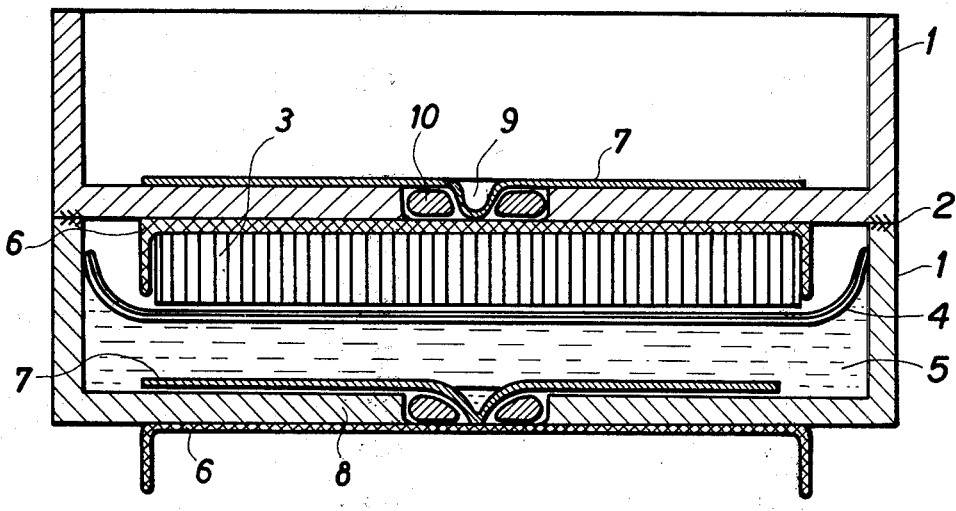

United States Patent [19]

Jensen

[11] 4,321,315
[45] Mar. 23, 1982

[54] ALKALINE BATTERY

[75] Inventor: Per J. T. Jensen, Slangerup, Denmark

[73] Assignee: A/S Hellesens, Soborg, Denmark

[21] Appl. No.: 154,056

[22] Filed: May 28, 1980

[51] Int. Cl.$^3$ ............................................. H01M 2/06
[52] U.S. Cl. ................................. 429/152; 429/158; 429/160; 429/178
[58] Field of Search ............... 429/170, 178, 181, 157, 429/158, 162, 151, 152, 154

[56] References Cited

U.S. PATENT DOCUMENTS

| | | | |
|---|---|---|---|
| 2,411,272 | 11/1946 | Keller | 429/170 |
| 2,419,589 | 4/1947 | Paul | 429/170 |
| 2,620,369 | 12/1952 | Daniel | 429/154 |
| 2,710,307 | 6/1955 | Szundy | 429/170 |
| 3,051,769 | 8/1962 | Jammet | 429/170 |
| 3,708,340 | 1/1973 | Tamminen | 429/157 X |
| 3,741,812 | 6/1973 | Spellman et al. | 429/162 |
| 3,773,562 | 11/1973 | Pinkowski et al. | 429/170 |
| 3,871,921 | 3/1975 | Beatty et al. | 429/162 X |
| 3,884,723 | 5/1975 | Wultke | 429/162 |
| 3,982,966 | 9/1976 | Beatty et al. | 429/136 |

FOREIGN PATENT DOCUMENTS 2109259  2/1972  Fed. Rep. of Germany ...... 429/178

Primary Examiner—Anthony Skapars
Attorney, Agent, or Firm—Cushman, Darby & Cushman

[57] ABSTRACT

A battery comprises a single flat cell with a cell casing in the form of a plastic cup, or several cells piled on each other, whereby the plastic cups are integrally connected along the circumference. Each plastic cup comprises a terminal plate located both on the inner side and on the outer side of the bottom of each cup. One of these terminal plates comprises a projecting knob extending through an aperture in the bottom of the cup, and is connected to the other terminal plate in such a manner that the plates squeeze tightly about the bottom of the cup and abut the upper and lower surfaces thereof by a permanent pressure. As a result, a durable, efficient sealing against electrolyte leakage at the terminal passage in the bottom of each plastic cup is provided.

5 Claims, 4 Drawing Figures

ALKALINE BATTERY

The present invention relates to a battery comprising a single flat cell or several cells piled on each other and being integrally connected along the circumference, said cells each comprising a zinc anode, an alkaline electrolyte, a cathode of mercuric oxide, mercury or manganese dioxide or a mixture thereof, and a cell casing in the form of a plastic cup, a terminal plate being located both on the inner and on the outer side of the bottom of said plastic cup.

German Pat. No. 906,586 discloses a battery block of flat cells. The active portions of these flat cells are located in frames of non-hardenable, thermoplastic material which has been made conductive by addition of carbon. This plate abuts a zinc plate extending from the cell below with a relatively large bent portion through a correspondingly shaped recess in the bottom of the frame. By sticking the zinc plate in each cell to the frame by using a solvent, a relatively good security against leakage of electrolyte to the conductive thermoplastic plate is obtained. This known construction does not, however, suffice in solving the sealing problems present by alkaline batteries of the above type.

By alkaline batteries of the above type with cells piled on each other, it has previously been a problem to obtain a sufficiently tight assembling of the cells into an integral unit. This problem has now been solved by using a particular method of assembling the cups along their periphery. By this method the cups are assembled at a time along the entire periphery by a quick process.

The object of the present invention is to provide an improved security against electrolyte leakage from an alkaline battery of the above type, by increasing the resistance to electrolyte leakage at the terminal passage in the bottom of each plastic cup.

Usually electrolyte leakage from an alkaline battery is due to one or more of the following well-known phenomena:
1. Capillary effect in the unevennesses of the surface, by a bad sealing etc.
2. Electrocapillary effect.
3. Oxygen reduction.
4. $H_2O$ reduction.
5. Electroosmosis.
6. The Marangoni effect.

It must, however, be regarded as certain that in addition to the above, terminal amalgamation is of substantial importance as the zinc electrodes contain mercury dispersing between zinc and terminal metal. This is of importance for the negative terminal, by which only the phenomena mentioned under items 3 to 6 occur, and by which experience shows the greatest sealing difficulties.

The battery according to the invention is characterized by the terminal plates abutting a substantial surface of the outer and the inner side of the bottom, whereby at least one and optionally both terminal plates comprise one or more projecting knobs, each knob extending through an aperture located in the bottom of the cup and being relatively small relative to the diameter of said bottom, each knob furthermore being connected, preferably by spot welding, to the second terminal plate in such a manner that the plates squeeze about and under pressure abut the material in the bottom of the cup being of or incorporating elastomeric material.

Such a connection with a great specific pressure between the terminal metal and the elastomeric material provides a durable sealing as cold flow is avoided, which would otherwise cause a decreasing pressure between polymer and metal. Futhermore a double sealing between metal and polymer is obtained with an interspace interrupting the capillary effect, and a long creepage path between terminal metal and polymer.

The connection is provided by a simple method and with a relatively great deformation of material, whereby rather great tolerances are permitted regarding the aperture in the plastic cup and regarding the metal knob and in a sealing ring located between the metal knob and the edge in one embodiment of the battery. In this embodiment two separate sealing portions are obtained between the metal and the rubber with air therebetween. As a result the capillary effect is interrupted.

As an additional reduction of the risk for electrolyte leakage, the terminal plate not containing the anode may according to the invention be of a metal particularly impeding for the reduction of $O_2$ and $H_2O$, and/or which can be manufactured particularly smooth, but for that matter may be unstable at contact with the anode.

According to an alternative embodiment of the battery according to the invention, the cups are cast of hard, thermoplastic elastomer, and the aperture in the bottom of each cup is defined by an edge shaped with annular projecting rim portions. Such a construction renders it possible to dispense with the sealing ring, whereby a quicker assembling process is provided.

By using plastic cups of elastomeric materials, cells having particularly good temperature properties are obtained, as these materials have very low glass transition temperatures, and the cups can resist strong mechanical influences in the late battery producing process.

Figure 2:
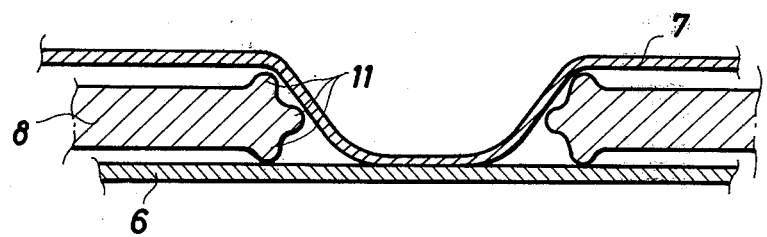
Figure 3:
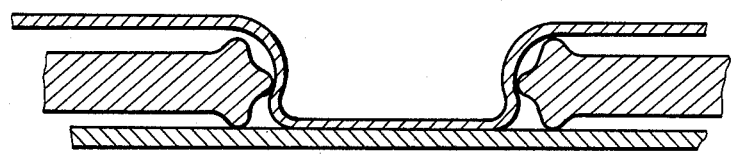
Figure 4:
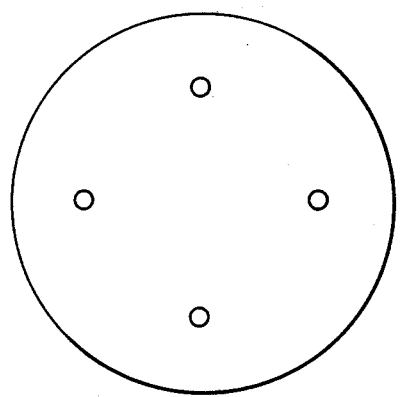

The invention will be described below with reference to the accompanying drawing, in which FIG. 1 illustrates a connection between two cells and a passage to the atmosphere in an embodiment of the battery according to the invention, FIG. 2 illustrates an alternative embodiment of the terminal passage between the cells or to the surroundings, and FIG. 3 illustrates a dovetailed knob, and FIG. 4 is a bottom view of a cell with four knobs.

FIG. 1 illustrates two plastic cups 1 forming cell casings interconnected by connecting surfaces 2 in an instant process influencing the entire periphery at the same time. Such an instant influence may for instance be produced by ultrasonic welding, gluing by dipping, hot welding, high frequency welding or another similar assembling process.

The lowermost cell in FIG. 1 is completely mounted with a pressed cathode 3 of mercuric oxide, mercury or manganese dioxide or mixtures thereof, two separator diaphragms 4, and an anode 5 comprising powdered zinc in alkaline electrolyte. A negative terminal plate 6 with curved edges is located above the cathode 3, and a terminal plate 7 is located under the anode 5 in the bottom of the cup.

The terminal plates 6 and 7 in plastic cups 1 piled on each other are interconnected through an aperture in the middle of the bottom 8 of the uppermost cup, the first terminal plate 7 comprising an embossed, projecting knob 9 extending through the aperture in the bottom of the cup, and furthermore being spot welded to the middle of the second terminal plate 6. The spot welding is performed in such a manner that the terminal plates 6 and 7 squeeze about the material in the bottom 8, whereby a pressure sealing between the terminal metals and the elastomeric material in the bottom is established. As a result cold flow and thereby involved decreasing contact pressure are avoided. As the terminal plates squeeze against both sides of the bottom, a double sealing between metal and plastic polymer surfaces under a specific sealing pressure is obtained, said sealing pressure being very high across the relatively small sealing portion. Furthermore, the terminal plate 6 may optionally consist of a metal particularly impeding for the reduction of $O_2$ and $H_2O$ etc., whereby an additional securing against leakage is provided. The battery illustrated furthermore provides a long electrolyte creepage path.

In the embodiment illustrated in FIG. 1, the knob 9 on the terminal plate 7 is surrounded by a sealing ring 10 such as for instance a torique of rubber deformed under influence of pressure when the terminal plates are being assembled. In this manner two separate sealing portions are provided between metal and rubber with air therebetween, which interrupt the capillary effect.

In the embodiment illustrated in FIG. 2 the plastic cup is cast of a hard, thermoplastic elastomer, and the edge about the aperture in the bottom of the cup is provided with three projecting sealing portions 11 forming three separate plastic-metal sealing portions with air therebetween.

It is to be understood that the above terminal passage principle may also be used in the top and the bottom of a single flat cell.

The metal-elastomer sealing provides a double sealing as two metals with an interspace therebetween are sealed by means of the same torique. Should the first sealing fail on account of the capillary effect, the interspace is capable of receiving part of the leakage before the second sealing enters into function. Furthermore, two different metals are used for the sealing. One metal, against which a sealing is aimed at, may not stand a location within the cell, but may stand a location in the atmosphere. Therefore it is an additional advantage that two different metals may now be employed.

According to an alternative embodiment, several pole connections from one cell to the other are provided, e.g. three or four pole connections. These pole connections may be provided along a circle concentric with the cup. The pole connections and the knobs 9 are preferably mutually located at the same angular distance. According to a preferred embodiment, the knobs are dovetailed. However, the knobs need not be equally formed or be provided in the same terminal plate of adjacent terminal plates.

The embodiments of the invention in which an exclusive property or privilege is claimed are defined as follows:

1. A battery comprising at least two flat cells stacked on each other and integrally connected along the circumference, said cells each comprising a zinc anode, an alkaline electrolyte, a cathode of a material selected from the group consisting of mercuric oxide, mercury or manganese dioxide or a mixture thereof, and a cell casing in the form of a plastic cup having a bottom comprising elastomeric material a terminal plate, the terminal plates being located both on the upper and lower surfaces of the bottom of the upper cup and abutting a substantial portion of said surfaces, at least one of said terminal plates comprising a plurality of projecting knobs, each knob extending through an aperture located in the bottom of the upper cut and being relatively small relative to the diameter of said bottom, each knob furthermore being conneted to the other terminal plate in such a manner that the plates squeeze about and under pressure abut the material in the bottom of the cup so as to form a pressure seal between the terminal plates and the elastomeric material, and a sealing ring located in said aperture and surrounding said knobs, the sealing ring being deformed by the pressure of the terminal plates.

2. A battery as claimed in claim 1, wherein the knobs are located along a circle concentric with the cup.

3. A battery as claimed in claim 2, wherein the knobs are mutually located at the same angular distance.

4. A battery as claimed in claim 1, wherein there are three knobs.

5. A battery as claimed in claim 1, wherein at least one of the knobs is dovetailed.

* * * * *